US010000587B2

(12) United States Patent
Knack

(10) Patent No.: US 10,000,587 B2
(45) Date of Patent: Jun. 19, 2018

(54) CROSS-LINKED POLYETHYLENE FIBER, ITS USE AND PROCESS FOR ITS MANUFACTURE

(71) Applicant: BAUMHUETER EXTRUSION GMBH, Rheda-Wiedenbrueck (DE)

(72) Inventor: Ingo Knack, Schwarzenbek (DE)

(73) Assignee: Baumhueter Extrusion Gmbh, Rheda-Wiedenbruek (DE)

( * ) Notice: Subject to any disclaimer, the term of this patent is extended or adjusted under 35 U.S.C. 154(b) by 0 days. days.

(21) Appl. No.: 14/421,231

(22) PCT Filed: Jul. 29, 2013

(86) PCT No.: PCT/EP2013/065869
§ 371 (c)(1),
(2) Date: Feb. 12, 2015

(87) PCT Pub. No.: WO2014/032879
PCT Pub. Date: Mar. 6, 2014

(65) Prior Publication Data
US 2015/0203607 A1    Jul. 23, 2015

(30) Foreign Application Priority Data

Aug. 31, 2012 (EP) .................................... 12182653

(51) Int. Cl.
| *D21H 27/08* | (2006.01) |
|---|---|
| *D21H 13/14* | (2006.01) |
| *D21H 13/16* | (2006.01) |
| *D01D 5/38* | (2006.01) |
| *C08F 10/02* | (2006.01) |
| *D06M 10/00* | (2006.01) |
| *D01D 10/00* | (2006.01) |
| *D01F 6/04* | (2006.01) |
| *D01F 6/30* | (2006.01) |
| *D01F 6/46* | (2006.01) |
| *B29C 47/00* | (2006.01) |
| *C08L 23/04* | (2006.01) |
| *C08L 23/12* | (2006.01) |
| *C08L 67/02* | (2006.01) |
| *B29K 23/00* | (2006.01) |
| *B29L 31/00* | (2006.01) |

(52) U.S. Cl.
CPC .......... *C08F 10/02* (2013.01); *B29C 47/0014* (2013.01); *C08L 23/04* (2013.01); *C08L 23/12* (2013.01); *C08L 67/02* (2013.01); *D01D 5/38* (2013.01); *D01D 10/00* (2013.01); *D01F 6/04* (2013.01); *D01F 6/30* (2013.01); *D01F 6/46* (2013.01); *D06M 10/008* (2013.01); *D21H 13/14* (2013.01); *D21H 13/16* (2013.01); *D21H 27/08* (2013.01); *B29K 2023/08* (2013.01); *B29L 2031/731* (2013.01)

(58) Field of Classification Search
CPC . D01D 10/00; D01D 5/08; D01D 5/38; D01F 6/30; D01F 6/04; D01F 6/46; D21H 3/14; D21H 27/08; D21H 13/16; Y10T 442/60; Y10T 428/1352; Y10T 428/2817; B29L 2031/731; C08F 10/02; C08L 23/04; C08L 23/12; C08L 67/02; B29C 47/0014; B29K 2023/08
See application file for complete search history.

(56) References Cited

U.S. PATENT DOCUMENTS

| 4,049,492 | A |   | 9/1977  | Lare |                  |
|-----------|---|---|---------|------|------------------|
| 4,049,493 | A |   | 9/1977  | Lare |                  |
| 4,367,185 | A |   | 1/1983  | Nojiri et al. |         |
| 4,820,585 | A |   | 4/1989  | Tedesco et al. |        |
| 5,160,464 | A | * | 11/1992 | Ward | ................... C08F 255/00 |
|           |   |   |         |      | 264/210.4 |
| 5,173,154 | A |   | 12/1992 | Heinrich |              |
| 5,487,943 | A |   | 1/1996  | Kozulla |               |
| 5,601,716 | A | * | 2/1997  | Heinrich | ................. A47J 31/08 |
|           |   |   |         |      | 210/490 |
| 5,616,408 | A |   | 4/1997  | Oleszczuk et al. |      |
| 5,645,057 | A |   | 7/1997  | Watt et al. |           |
| 5,749,961 | A |   | 5/1998  | Jaklin |                |
| 6,106,935 | A | * | 8/2000  | Lambert | ................. B32B 27/08 |
|           |   |   |         |      | 428/216 |
| 6,139,883 | A | * | 10/2000 | Gbur | ........................ B32B 7/02 |
|           |   |   |         |      | 426/77 |
| 6,162,843 | A | * | 12/2000 | Fisher | ................... C08F 255/00 |
|           |   |   |         |      | 522/114 |

(Continued)

FOREIGN PATENT DOCUMENTS

| DE | 3641893 A1 | * | 6/1988 | ............. A61L 15/24 |
|----|-----------|---|--------|-------------------------|
| EP | 0 225 404 A1 |   | 6/1987 |                       |

(Continued)

OTHER PUBLICATIONS

PCT/EP2013/065869—International Search Report, dated Oct. 9, 2013.
PCT/EP2013/065869—International Written Opinion, dated Oct. 9, 2013.
PCT/EP2013/065869—International Preliminary Report on Patentability, dated Mar. 3, 2015.
http://books.google.com/Polypropylene: The Definitive User's Guide and Databook, p. 63. 2013.
Martinez-Berrera G., et al.; "Mechanical Improvement of Concrete by Irradiated Polypropylene Fibers", Polymer Engineering and Science, Brookfield Center, US; vol. 45, Nr:10, pp. 1426-1431; Publication Info: XP002536094, Aug. 25, 2005.

(Continued)

*Primary Examiner* — Jose A Fortuna
(74) *Attorney, Agent, or Firm* — Curatolo Sidoti Co., LPA; Joseph G. Curatolo; Salvatore A. Sidoti

(57) ABSTRACT

The present invention relates to a polymer fiber, in particular a polyethylene polymer fiber obtainable by melt-spinning of a polyethylene polymer, the use of the fiber and a process for the manufacture of the fiber. Further, the present invention relates to a heat sealable filter paper comprising said polymer fiber.

10 Claims, No Drawings

(56) References Cited

U.S. PATENT DOCUMENTS

| | | | |
|---|---|---|---|
| 6,171,443 B1 | 1/2001 | Goettmann et al. | |
| 6,338,772 B1 * | 1/2002 | Nakagawa | C08L 51/06 |
| | | | 162/129 |
| 6,437,014 B1 | 8/2002 | Ho et al. | |
| 6,881,256 B2 | 4/2005 | Orange et al. | |
| 2003/0019598 A1 | 1/2003 | Nakagawa et al. | |
| 2003/0150364 A1 | 8/2003 | Orange et al. | |
| 2004/0132854 A1 * | 7/2004 | Du Plessis | C08J 3/244 |
| | | | 522/114 |
| 2006/0035996 A1 | 2/2006 | Debras et al. | |
| 2006/0078729 A1 | 4/2006 | Yabuki et al. | |
| 2006/0172637 A1 | 8/2006 | Hosokawa et al. | |
| 2007/0203301 A1 | 8/2007 | Autran et al. | |
| 2012/0009841 A1 * | 1/2012 | Knack | B01D 39/1623 |
| | | | 442/408 |
| 2012/0071589 A1 * | 3/2012 | Knack | B01D 39/1623 |
| | | | 524/8 |
| 2015/0203607 A1 * | 7/2015 | Knack | D21H 27/08 |
| | | | 162/146 |
| 2015/0308038 A1 * | 10/2015 | Knack | B01D 39/1623 |
| | | | 264/469 |
| 2015/0336039 A1 * | 11/2015 | Knack | B01D 39/1623 |
| | | | 210/483 |

FOREIGN PATENT DOCUMENTS

| | | | | |
|---|---|---|---|---|
| EP | 0 235 577 | A2 | 9/1987 | |
| EP | 0 448 577 | A1 | 10/1991 | |
| EP | 0 621 356 | A2 | 10/1994 | |
| EP | 0 799 839 | A2 | 10/1997 | |
| EP | 1 170 306 | A1 | 1/2002 | |
| EP | 1 266 997 | A1 | 12/2002 | |
| EP | 1 580 173 | A1 | 9/2005 | |
| EP | 1 604 813 | A1 | 12/2005 | |
| EP | 2230350 | A1 * | 9/2010 | D06M 10/00 |
| EP | 2703528 | A1 * | 3/2014 | D12H 27/08 |
| GB | 823348 | A | 11/1959 | |
| GB | 1 603 638 | A | 11/1981 | |
| JP | H 0441769 | A | 2/1992 | |
| JP | 06/313217 | A | 11/1994 | |
| JP | 09/501990 | A | 2/1997 | |
| JP | H 10245758 | A | 9/1998 | |
| JP | 2002/517545 | A | 6/2002 | |
| JP | 2003/506513 | A | 2/2003 | |
| JP | 2008/538390 | A | 10/2008 | |
| WO | WO 90/06902 | A1 | 6/1990 | |
| WO | WO 95/06151 | A1 | 3/1995 | |
| WO | WO 99/63021 | A1 | 12/1999 | |
| WO | WO 00/040789 | A | 7/2000 | |
| WO | WO 01/09239 | A1 | 2/2001 | |
| WO | WO 01/048041 | A | 7/2001 | |
| WO | WO 2004077935 | A1 * | 9/2004 | A01G 9/1438 |
| WO | WO 2006/102149 | A1 | 9/2006 | |
| WO | WO 2009/011480 | A1 | 1/2009 | |
| WO | WO 2010/105981 | A1 | 9/2010 | |

OTHER PUBLICATIONS

Martinez-Berrera G., et al.; "Concrete Reinforced with Irradiated Nylon Fibers", Journal of Materials Research, Warrendale, PA, US; vol. 21, Nr:2, pp. 484-491; Publication Info: XP002536095, Feb. 1, 2006. Abstract Only.

Database WPI Week 199239, "JP 04 222206 A", Abstract, Thompson Scientific, London, GB, AN 1992-319074. XP002536128, Aug. 12, 1992.

* cited by examiner

CROSS-LINKED POLYETHYLENE FIBER, ITS USE AND PROCESS FOR ITS MANUFACTURE

CROSS REFERENCE TO RELATED APPLICATIONS

This application is a national stage application of International Application No. PCT/EP2013/065869, filed 29 Jul. 2013, which claims priority from European Patent Application No. 12182653.1, filed 31 Aug. 2012, from which applications priority is claimed, and which are incorporated herein by reference.

The present invention relates to a polymer fiber, in particular a polyethylene polymer fiber obtainable by melt-spinning of a polyethylene polymer, the use of the fiber and a process for the manufacture of the fiber. Further, the present invention relates to a heat sealable filter paper comprising said polymer fiber.

The use of synthetic wood pulp is known in the art as replacement for wood pulp for the production of paper-like substrates, e.g. tea-bags or coffee-pads, e.g. from U.S. Pat. No. 4,049,493. In particular, tea-bag papers consist of about 75% of natural fiber and about 25% of synthetic material in order to provide the possibility of heat-sealing the bags.

U.S. Pat. No. 5,173,154 discloses a tea-bag paper comprising a first phase of natural fibers in a weight-percentage from 60% to 85%, and a second phase of heat-sealable synthetic fibers with the remainder of the weight-percentage of about from 15% to 40%. The disclosed tea-bag paper is said to be processable on special high-speed automatic tea-bag packing machines, because of the heat-sealable side of the bag.

While several processes for the preparation of synthetic wood pulp are known in the art, e.g. from U.S. Pat. No. 4,049,492 and U.S. Pat. No. 4,049,493, the typical processes for the production of synthetic wood pulp are complicated and comprise steps of refining solid polyolefinic fibrids in organic dispersants and replacement of the dispersant with water so as to form an essentially aqueous slurry of the polyolefin fibrids.

Thus, there is still a need in synthetic polymeric material which can be manufactured in an easy and economic way and which is useful as an additive to or replacement for wood pulp, e.g. for the production of paper-like substrates, in particular heat-sealable filter paper.

EP 056224 A1 discloses a filter material particularly useful in the manufacture of tea bags, which filter materials includes two layers superimposed. A first layer is composed of natural fibers, and a second layer is composed of synthetic fibers, rendering the filter material heat-sealable. The synthetic fibers are preferably made of a thermoplastic polymer, in particular polyethylene or polypropylene.

Polyethylene fibers are known in the art for many applications due to the advantageous properties of polyethylene, copolymers and polymer blends thereof. Polyethylene is a polymer with thermoplastic properties, it shows excellent chemical stability and has a rather low prize. Polymer fibers of different properties can be manufactured by melt-spinning of a polyethylene polymer. However, in a melt-spinning process the specific properties of the polymer material must be taken into account. Important melt-spinning process parameters, and consequently of importance to the property profile of the fiber to be produced, are molecular weight, melt-flow index and raw material molecular weight distribution.

It is generally possible to melt spin polymers with a MFI of lower than 5 g/10 min. However, high pressures have to be applied to melt-spin these high viscous polymers, which is cost-intensive. Further the maximum speed of melt spinning of these polymers is significantly reduced compared to speeds obtainable with polymers having a MFI of above 5 g/10 min, typically about 5 g/10 min to about 100 g/10 min.

On the other hand, if the MFI value of the polymer is too high (above 200 g/10 min), the viscosity of the polymer becomes so low that when continuous fibers are obtained the fibers show low mechanical stability and are not suitable for further processing, e.g. weaving. As a result thereof the MFI value of polymers suitable for the preparation of fibers by melt-spinning is typically in a certain range of above 5 g/10 min to about 200 g/10 min, under specific conditions as known art fibers can be obtained by melt spinning polymers, in particular polyethylene, having an MFI up to about 400 g/10 min.

It is known, e.g. from WO 2010/105981 A1, that when a polyethylene fiber made of polymer having a MFI of above 5 g/10 min to about 100 g/10 min is used to replace synthetic wood pulp in heat-sealable filter papers, deposits on machine parts are built up during manufacture of the filter papers, in particular in the drying unit, and during heat-sealing of the filter papers in the tea-bag machine. These deposits negatively affect the machine's function and thereby rendered the known polyethylene polymer fibers unsuitable for use in heat-sealable filter papers.

To overcome this problem WO 2010/105981 A1 suggests that when known polyethylene fibers are crosslinked by ionizing radiation, the crosslinked polymer fibers can excellently be used as an additive to or a replacement for synthetic wood pulp, in particular in heat-sealable filter papers. In particular, no deposits are built on machine parts during manufacture of the filter papers, in particular in the drying unit, and when the filter papers are heat-sealed in the tea-bag machine.

While the polyethylene fibers suggested in WO 2010/105981 A1 can be used in heat-sealable filter papers, it has been found that the sealing of such filter papers is not optimal. Under specific conditions, the sealing did not provide optimal strength of the heat seal. Not wishing to be bound by theory it is believed that while the crosslinked polymer provides sufficient strength and heat resistivity to be heat sealed, under specific conditions too less material is melted to provide sufficient contact for optimally closing the seal, and thus the strength of the heat seal is not optimal.

It has been found that it was not successful to simply add material having a higher MFI, which when heated for sealing would be expected to melt and to provide sufficient seal contacts, to the fiber material polymer which is used for heat sealing, in particular as synthetic wood pulp replacement. Rather addition of known polymeric material having higher MFI, like polyethylene having a MFI above 40 g/10 min, again showed unacceptable deposits in the tea-bag machines during heat sealing.

However it has been surprisingly found that when polymeric material having sufficiently high MFI, e.g. above 100 g/10 min, is subjected to ionizing radiation to obtain a polymer having a MFI in the range of about 1 to about 80 g/10 min, this polymer, in particular when added to polymer fibers, such as polyethylene fibers, e.g. those as known from WO 2010/105981 A1, provides heat seals with excellent strength.

Thus, the present invention relates to a polymer fiber obtainable by melt-spinning of a polymer having a MFI of about 100 g/10 min to about 400 g/10 min, preferably above 120 g/10 min to about 250 g/10 min, in particular above 150 g/10 min to about 220 g/10 min, e.g. about 160 to about 200 g/10 min characterized in that subsequent to the melt-spinning step the fiber is treated with ionizing radiation. The MFI value of the crosslinked fiber is about 80 g/10 min or less, preferably about 40 g/10 min or less, such as about 30 g/10 min or less, or even about 20 g/10 min or less. Typically the MFI value of the crosslinked fiber is equal to or above about 1 g/10 min, preferably equal to or above 10 g/10 min, in particular equal to or above 15 g/10 min. Preferred the MFI value of the crosslinked fiber is about 1 g/10 min to about 80 g/10 min, most preferably about 10 g/10 min to about 80 g/10 min, e.g. about 40 g/10 min to about 80 g/10 min.

Polymers suitable for the preparation of the fibers of the present invention are not particularly limited. Any polymer known to the skilled person and being useful in the preparation of polymer fibers by melt-spinning can be employed. Examples for such polymers are polymers containing a polyolefin, a thermoplastic elastomer, a polyamide, a polyester, and mixtures of any of these.

The polymer used in the preparation of the fiber of the present invention is preferably a polyethylene. The polyethylene can be a homopolymer or a copolymer, such as a polyethylene/polypropylene copolymer, a polymer blend comprising polyethylene as one polymer, such as polyethylene/polypropylene blend or a mixture of any of these, including polyethylene-based thermoplastic elastomers (TPEs).

In one preferred embodiment the polymer used in the polymer fibers substantially comprises polyethylene, or a copolymer of polyethylene or polymer blend comprising polyethylene as one polymer. The polymer blends typically substantially comprise polyethylene. The polyethylene used can be a homopolymer, or a copolymer of polyethylene, or polymer blend comprising polyethylene homopolymer or a polyethylene copolymer as one polymer. Preferred copolymers or blends of polyethylene are copolymers or polymer blends between polyethylene and α-olefins, such as propylene and 1-butene, preferably propylene. Preferably, a polyethylene containing about 1 wt.-% to about 15 wt.-%, more preferably about 2 wt.-% to about 9 wt.-% of an α-olefin, e.g. propylene, as a copolymer or polymer blend and most preferably having a melt flow index of about 100 g/10 min to about 200 g/10 min is used. In particular, random copolymers, block copolymers or polymer blends between ethylene and propylene are used. The polyethylene homopolymer, copolymer or polymer blend may be mixed with propylene polymer such as polypropylene, e.g. such having a melt flow index of about 100 g/10 min to about 200 g/10 min, and/or copolymers of ethylene with polymers like propylene, vinyl acetate, acrylic acid, and ethyl acrylate. The amount of polyethylene homopolymer or copolymer is preferably about 70 wt.-% to about 100 wt.-%, more preferably about 80 wt.-% to about 95 wt.-%, such as about 85 wt.-% to about 90 wt.-% of the polymer. Most preferred the polymer is a polyethylene homopolymer.

In one preferred embodiment the polymer is a polyethylene-based TPE (thermoplastic elastomer) which are sometimes referred to in the art as "thermoplastic rubber". TPE is a class of copolymer or polymer blends which consist of materials with both thermoplastic and elastomeric properties. Typically TPEs are polyethylene or polypropylene blends with rubbers, such as polyethylene/EPDM blends or polypropylene/EPDM blends (EPDM=ethylene propylene diene monomer rubber), wherein the monomer is preferably M-class (referring to the classification in ASDN Standard D-1418). Typical EPDM rubbers are DCPD (dicyclopentadiene), ENB (ethylidene norbornene) and VNB (vinyl norbornene). The typical polyethylene content in the polyethylene/EPDM blends is about 50 wt.-% to about 95 wt.-%, more preferably about 70 wt.-% to about 90 wt.-%. The typical ethylene content in the EPDM rubber is about 45 wt.-% to about 75 wt.-%, preferably about 55 wt.-% to about 70 wt.-%. The higher the ethylene content, the higher the loading possibilities of the polymer, which leads to better mixing and extrusion. The dienes, which are typically comprised between about 2.5 wt.-% to about 12 wt.-%, preferably about 5 wt.-% to about 10 wt.-%, of the polymer blend, serve as crosslinks which provide resistance to unwanted tackiness, creep or float during end use.

In a further preferred embodiment the polyethylene is HDPE (density typically between 0.94 g/cm$^3$ to 0.97 g/cm$^3$), LDPE (density typically between 0.915 g/cm$^3$ to 0.935 g/cm$^3$) or LLDPE (linear low density polyethylene; density typically equal to or below 0.95 g/cm$^3$), or mixtures thereof. Preferably LDPE or LLDPE are used in the above described polymer blends. Alternatively, the polyethylene can be a polyethylene/EVA (ethylene vinyl acetate) copolymer which is preferably used in the above described polymer blends. Typically, the content of the vinyl acetate in the EVA is about 5 wt.-% to about 45 wt.-%, preferably about 10 wt.-% to about 40 wt.-%, with the remainder preferably being ethylene. EVA based copolymers have advantageous elastomeric properties, and yet can be processed like other thermoplastics.

The term "substantially comprises" as used herein means that the amount of the respective components is at least 80 wt.-%, more preferably at least 90 wt.-%, in particular at least 95 wt.-%, e.g. at least 99 wt.-% based on the total weight of the respective composition. In one preferred embodiment the polymer used for the polymer fibers consists of polyethylene or a copolymer or polymer blend thereof, respectively, as the only polymeric component.

An advantage of using polyethylene, in particular with the fibers of the present invention as described above, is that polyethylene typically has an excellent chemical and thermal resistance and is suitable for use in food applications. The products comprising the fibers according to the present invention comprising polyethylene or the respective copolymers or polymer blends as described above, which have been subjected to an ionizing radiation treatment, both show an excellent temperature resistance conferred by the radiation and chemical resistance conferred by the polyethylene material, and are particularly suitable for use in heat sealing paper.

The polymer used in the preparation of the fiber of the present invention can contain further polymers as well as additives, such as colourants, glidents, spinning additives, functional copolymers, low molecular weight polypropylene, polypropylene waxes, atactic polypropylene, reactive components, thermostabilizers, UV stabilizers, etc. The additives can be selected by a person skilled in the art according to the specific requirements of the melt-spinning process as well as the intended use of the final fibers, in particular for heat sealing papers.

In a preferred embodiment the polymer comprises known metal activators, e.g. metal activators comprising redox-active transition metal ions like $Fe^{2+}/Fe^{3+}$, $Co^{2+}/Co^{3+}$, $Cu^+/Cu^{2+}$, $Cr^{2+}/Cr^{3+}$, or $Mn^{2+}/Mn^{3+}/Mn^{4+}$, such as CuO. Typically the polymer comprises the metal activator in an amount of about 0.001 wt.-% to about 1 wt.-%, preferably in an amount of about 0.01 wt.-% to about 0.5 wt.-%, based on the total weight of the polymer. It has been found that when metal activators are present in the polymer the efficacy of the ionizing radiation is increased. Thus, the presence of metal activators is advantageous as less radiation is necessary in order to provide a sufficient crosslinking of the polyethylene polymer.

In one embodiment the polymer used in the preparation of the fiber of the present invention comprises a crosslinking agent. The crosslinking agent to be used with the polymer as described above typically is a triacrylate or trimethacrylate of an aliphatic polyhydric alcohol. Specific compounds suitable as crosslinking agent include, for example, trimethylol propane triacrylate, trimethylol propane trimethacrylate, trimethylol ethane triacrylate and tetramethylol methane triacrylate. Particularly preferable are trimethylol propane triacrylate and trimethylol propane trimethacrylate. The crosslinking agent is typically present in an amount of about 0.5 wt.-% to about 4 wt.-%, based on the weight of the polymer. Trimethylol propane triacrylate and trimethylol propane trimethacrylate are highly compatible with polymer and exhibit a high crosslinking effect. Most preferably, the amount of crosslinking agent ranges between about 1.0 wt.-% to about 2.5 wt.-%, based on the weight of the polymer. Derivatives of phenolic compounds may additionally be used, such as those compounds disclosed in U.S. Pat. No. 4,367,185, to enhance the crosslinking effect. The amount of the phenolic compound derivative typically is in the range from 0.01 wt.-% to 5.0 wt.-% based on the weight of the polymer.

In one embodiment the polymer used in the preparation of the fiber of the present invention comprises a silane(-based) crosslinking agent. Typical silane crosslinking agents are known in the art. Non-limiting examples of suitable silane crosslinking agents include unsaturated silanes that comprise an ethylenically unsaturated hydrocarbyl group, such as vinyl, allyl, isopropenyl, butenyl, cyclohexenyl or gamma-(meth)acryloxy allyl group, and a hydrolysable group such as a hydrocarbyloxy, hydrocarbonyloxy, and hydrocarbylamino group. In another embodiment the silanes are unsaturated alkoxy silanes which can be grafted onto the polymer. Examples of suitable silane crosslinking agents are vinyl trimethoxy silane, vinyltriethoxysilane, vinyltris(2-methoxyethoxy)silane, vinyltriacetoxysilane, vinylmethyldimethoxysilane, 3-methacryloyloxypropyltrimethoxy-silane, and combinations thereof. The amount of silane crosslinking agent is typically in the range of about 0.1 wt.-% to about 1 wt.-%, preferably about 0.5 wt.-% to about 1 wt.-%, based on the total weight of the polymer. While the above mentioned crosslinking agents as well as silicone based crosslinking agents described herein can be excellently combined with crosslinking by ionizing radiation as described herein, it has been found that crosslinking by peroxides as known in the art cannot suitably be applied for the manufacture of crosslinked polymer fibers, in particular polyethylene fibers.

The preparation of fibers by melt-spinning is known to a person skilled in the art. The process is described, for example, by B. von Falkai, Synthesefasern, Grundlagen, Technologie, Verarbeitung and Anwendung, Verlag Chemie, Weinheim 1981. In the melt-spinning process the properties of the polymer are generally not significantly altered.

Thus, for example the MFI value of the fibers obtained in this melt-spinning process is nearly the same as the MFI value of the polymer granules used as starting material. Therefore, the MFI value of polymer fibers obtained by melt-spinning is in the same range as the MFI value of those polymers which are used for the melt-spinning process as described above, e.g. the MFI is in the range of above 100 g/10 min to about 400 g/10 min, in particular above 100 g/10 min to about 250 g/10 min, e.g. from about 150 g/10 min to about 220 g/10 min.

According to the invention the rheological properties of the polymer fibers obtained in the melt-spinning process are tailored according to the requirements of the intended use of the fibers by treating the fibers with ionizing radiation. Preferably the ionizing radiation is a gamma or beta radiation.

The gamma- and beta-ray treatment is carried out by means of irradiation procedures known in the art. Beta-rays, also known as electron beams, are generated by electron accelerators generally known in the art. Gamma-rays used in industrial applications are generally generated in the radioactive conversion of cobalt 60 ($^{60}Co$) to nickel 60 ($^{60}Ni$). The thereby emitted gamma-rays have a high penetration depth. While the time of irradiation with beta-rays is generally within seconds, the time of irradiation with gamma-rays can be within hours. The radiation dose applied on the polymer fibers according to the invention is not particularly limited but normally in the range of about 10 kGy to about 300 kGy (kilo Gray), preferably about 20 kGy to about 100 kGy.

By crosslinking the polymer, i.e. the treatment with ionizing radiation, the properties of the polymer fiber are altered. For example the MFI value of the polymer fiber, depending on the polymer used for the preparation of the fiber, is increased or decreased. For example in case of polypropylene the MFI is increased, when no crosslinking agent is present, due to bond cleavage of the polymer chain, while in case of polyethylene the MR is decreased by crosslinking of the polymer. Accordingly, other properties of the polymer fiber, such as the average molecular weight of the polymer and/or the molecular weight distribution of the polymer are altered. Further, by irradiation with ionizing radiation the thermoplastic properties of polyethylene are changed to thermoelastic properties. This can be seen e.g. in the loss of thermal shrinkage of the polyethylene after irradiation. Further the melt of the irradiated polyethylene shows increased tenacity. Thus, the properties of the polymer fibers, in particular the polyethylene fibers can be tailored according to the requirements of the intended use of the fibers, in particular as additive for heat sealing filter paper.

Of particular relevance for the polymer fibers of the present invention is the MFI (melt flow index) value, also designated as melt flow rate (MFR). The MFI value of the polymer fibers is measured according to DIN EN ISO 1133. According to this definition the standard measurement conditions for measuring the MFI are 190° C./2.16 kg for polyethylene and 230° C./2.16 kg for polypropylene. The unit for the MFI is g/10 min and it is measured by means of a capillary rheometer, whereby the material, i.e. the polymer, is melted in a cylinder form and pressed through a defined nozzle with a certain pressure. Then the emerged mass of the polymer melt is detected as a function of time.

The polymer used in the process for the preparation of the polymer fiber according to the invention is a polymer as defined above, preferably a polyethylene homopolymer, polyethylene copolymer, polymer blends comprising polyethylene as one polymer, which blends preferably substantially comprise polyethylene, or a mixture thereof. The MFI value of the crosslinked polymer fiber is about 1 g/10 min to about 80 g/10 min, preferably about 20 g/10 min to about 80 g/10 min, such as about 40 g/10 min to about 80 g/10 min.

The polymer fiber of the present invention is obtainable by a process for the manufacture of a polymer fiber comprising the steps of melt-spinning of a polymer as defined above and subsequent treatment of the fiber with ionizing radiation. The present invention also relates to said process. In this process the polymer fiber is obtained either as a continuous strand or the strand is cut into pieces. The treatment with ionizing radiation can be carried out directly after the polymer fiber is formed, for example before, during or after the polymer fiber is stretched, but before it is cut into pieces or after it is cut into pieces. It is also possible that after the continuous polymer fiber strand or the cut polymer fiber pieces are obtained, these are stored for some time and the step of treatment with an ionizing radiation is carried out at a later time.

Commercially available polymers with high MFI, in particular polyethylene, having an MFI between about 100 g/10 min to 400 g/10 min can be subjected to melt-spinning and ionizing radiation to obtain the polymer fibers of the present application.

An appropriate diameter of the polymer fiber according to the invention is typically less than about 170 μm, preferably less than about 100 μm, in particular less than about 40 μm, and is preferably in the range of from about 5 μm to about 170 μm, more preferably from about 12 μm to about 50 μm, and most preferably the diameter of the fiber is about 20 μm to about 25 μm, e.g. about 23 μm.

The length of the polymer fibers before crosslinking the fiber by ionizing radiation is typically less than about 20 mm, preferably less than about 10 mm, in particular less than about 6 mm, and preferably from about 0.1 mm to about 40 mm, such as from about 2 mm to about 20 mm, and in particular from about 2 mm to about 5 mm, e.g. about 2 mm to about 3 mm. Crosslinking the fibers by ionizing radiation leads to a reduction of the length of the fiber, typically in the range of a reduction of about one third of the length before radiation, dependent on the total dose applied. Thus, the fibers can be irradiated before cutting, or the fibers are cut after irradiation.

In one aspect the present invention relates to the use of a polyethylene fiber which has been crosslinked by ionizing radiation as described above, in heat sealable filter papers.

In a preferred aspect the present invention provides the use of the above polymer fibers in hot sealable filter paper as well as hot sealable filter paper containing a polymer fiber as described above. In hot sealable filter paper polyethylene fibers containing a polyethylene homopolymer, polyethylene copolymer, polymer blends comprising polyethylene as one polymer or mixtures thereof are preferably used. By the treatment with ionizing radiation the polymer is crosslinked, which can be detected by a decrease in MFI, thereby obtaining products having a higher melt viscosity compared to products obtained from polyethylene fibers after melt-spinning but without treatment with ionizing radiation. Due to the crosslinking of the fibers advantageous properties can be imparted to the filter paper as described above. Not wishing to be bond by theory it is believed that by irradiating the polymer is altered advantageously in its rheological behaviour. On one side the low MFI polymer is sufficient fluid when melted to provide sufficient sealing contact, and on the other side it has sufficient tenacity and a suitable melt flow such that it does not drip off from the filter paper or does not soak into the filter paper too much.

The filter paper is typically composed and can be prepared as known in the art, e.g. as described in EP 656 224 A1, which is referred to by reference herein. Typically, the filter paper comprises at least two layers, the first preferably comprising natural fibers, e.g. cellulose-based fibers, and the second layer preferably comprising fibers comprising the polymer fibers as described herein.

The heat-sealable filter paper according to the present application typically contains the ingredients as known from filter papers, e.g. natural fibers, preferably based on cellulose, in a weight-percentage from about 60% to about 85%, the remainder of about 40 wt.-% to about 15 wt.-% being synthetic fibers, like synthetic wood pulp. The synthetic fibers are at least partially, preferably completely replaced by polymer fibers, in particular in an amount of about 20 wt.-% to about 100 wt.-%, preferably of about 50 wt.-% to about 100 wt.-%. The polymer fibers typically comprise 1% to 100% by weight, preferably about 2% to about 80% by weight, more preferably about 10% to about 40% by weight, in particular about 5% to about 25% by weight of the crosslinked polymer fibers according to the present application.

In a further preferred aspect the present invention relates to a mixture of polymer fibers comprising the polymer fibers according to the present invention. The fibers to be mixed with the fibers of the present invention can be based on polypropylene, polyester, PET (polyethylene terephthalate), in particular PET having an intrinsic viscosity in the range of about 0.5 to about 0.9, or on polyethylene, or a mixture thereof, preferably a polyethylene based polymer having an MFI lower than 50 g/10 min, in particular lower than 20 g/10 min, or any mixture of these. Preferably, the fiber to be mixed with the fiber of the present invention is a polymer fiber obtainable by melt-spinning of a polymer having an MFI of about 5 g/10 min to about 100 g/10 min, wherein subsequent to the melt-spinning step the fiber is treated with ionizing radiation, wherein the polymer is preferably a polyethylene homopolymer, polyethylene copolymer, polymer blend comprising polyethylene as one polymer, which blend preferably substantially comprises polyethylene, or a mixture thereof, and wherein the crosslinked polymer fiber has an MFI of about 5 g/10 min or less. These fibers are known in the art, e.g. from WO 2010/105981, and are preferably mixed with the fibers of the present invention to obtain the mixture of the present invention.

In the mixture of the polymer fibers of the present invention the amount of fibers according to the present invention is typically above 1% to about 99.9% by weight, preferably about 2% to about 80% by weight, in particular about 10% to about 50% by weight.

In a preferred aspect the present invention relates to a heat-sealable filter paper, or tea-bags or coffee-pads containing the crosslinked polyethylene fiber or the mixture of polymer fibers as described above. The heat-sealable filter paper according to the present invention can be advantageously used in tea-bags or coffee-pads. Thus, the present invention preferably also relates to tea-bags or coffee-pads comprising heat-sealable filter paper according to the present invention, and to the respective use of the fibers of the present invention in tea-bags or coffee-pads.

The present invention further relates to the use of the mixture of polymer fibers according to the present invention in heat-sealable filter paper, in tea-bags or coffee-pads.

The present invention will now be further illustrated by the examples which are not intended to be construed as limiting.

EXAMPLE 1

Beta-Ray Treatment of Polyethylene (PE) Fibers having Normal MFI (Comparative)

PE fiber samples of the type PB Eurofiber cut F-2427 6 mm length with 4 dtex (corresponding to a diameter of about 23 μm), manufactured from baumhueter extrusion GmbH were treated with beta-rays at doses of 35-160 kGy. The length of the fibers after irradiation is about 4.5 mm. Also PE fiber samples of the type PB Eurofiber cut F-2382 2 mm length with 4 dtex (corresponding to a diameter of about 23 μm) manufactured from baumhueter extrusion GmbH were treated with beta-rays at doses of 50 kGy. The length of the fibers after irradiation is about 1.5 mm.

Further PE (polyethylene homopolymer) fiber samples of the type PB Eurofiber cut F-2321/M1 and F-2422/M50, both 2 mm length with 4 dtex (corresponding to a diameter of about 23 μm) manufactured from baumhueter extrusion GmbH were treated with beta-rays at doses of 100 kGy and 70 kGy, respectively.

The MFI values were measured before and after treatment with ionizing radiation. The MFI measurements were carried out according to DIN EN ISO 1133 under standard conditions, namely 190° C./2.16 kg.

Filter papers comprising the fibers F-2382 before and after crosslinking by irradiation were tested for heat sealability. Further filter papers comprising the fibers F-2421/M1 and F-2422/M50 were tested for heat sealability. The results are summarized in the following table.

TABLE 1

| Fiber | Dose (kGy) | MFI before treatment (g/10 min; 190° C./2, 16 kg) | MFI after treatment (g/10 min; 190° C./2, 16 kg) | Heat-sealable filter-paper |
|---|---|---|---|---|
| F-2427 | 0 | 30 | — | Not tested |
|  | 35 | " | 11 | " |
|  | 50 | " | 4 | " |
|  | 160 | " | 0* | " |
| F-2382 | 0 | 20 | — | 1) |
|  | 50 | " | 5 | 2) |
| F-2421/M1 | 0 | 180 | — | 1) |
|  | 100 | " | 1-2 | 3) |
| F2422/M50 | 0 | 180 | — | 1) |
|  | 70 | " | 30-60 | 3) |

*Highly cross-linked, no longer meltable.
1) Without cross-linking the fiber is not processable on a paper machine due to problems in the drying unit, caused by the free flowing melting of the fiber.
2) Production of tea-bag paper without any problems. The paper was successfully tested on a tea-bag machine. The strength of the heat seal is acceptable.
3) Production of tea-bag paper without any problems. The paper was successfully tested on a tea-bag machine. The strength of the heat seal is excellent.

The above results demonstrate that the irradiated PE fibers having high MFI according to the invention can be excellently applied in heat-sealable papers, while irradiated PE fibers having low MFI can be applied with only acceptable seal strength, and while untreated fibers cannot be applied. Further no polymer deposits on machine parts can be detected during manufacture of the filter papers in the tea-bag machine when filter papers containing irradiated PE fibers are heat sealed.

The invention claimed is:

1. Heat-sealable filter paper comprising a crosslinked polyethylene fiber in an amount from about 15 to about 40 weight percent based on the total weight of the heat-sealable filter paper, wherein the crosslinked polyethylene fiber is obtained by melt-spinning of a polyethylene polymer having a melt-flow index (MFI) of above 120 g/10 min to about 400 g/10 min, wherein subsequent to the melt-spinning step the fiber is treated with ionizing radiation to obtain a crosslinked polyethylene polymer fiber, wherein the polyethylene polymer is a polyethylene homopolymer, a polyethylene copolymer, polymer blend comprising polyethylene as one polymer, or a mixture thereof, wherein the crosslinked polyethylene polymer fiber has a MFI of about 1 to about 80 g/10 min.

2. The heat-sealable filter paper of claim 1, wherein the polyethylene polymer has an MFI of about 120 g/10 min to about 250 g/10 min.

3. The heat-sealable filter paper of claim 1, wherein the polyethylene polymer has an MFI of about 150 g/10 min to about 220 g/10 min.

4. The heat-sealable filter paper of claim 1, wherein the polyethylene polymer has an MFI of about 160 g/10 min to about 200 g/10 min.

5. The heat-sealable filter paper of claim 1, wherein the crosslinked polymer fiber has an MFI of about 40 g/10 min to 80 g/10 min.

6. Heat-sealable filter paper comprising a mixture of polymer fibers in an amount from about 15 to about 40 weight percent based on the total weight of the heat-sealable filter paper, wherein the mixture of polymer fibers comprises a crosslinked polyethylene fiber and a second polymer fiber having melt-flow index (MFI) below 5, wherein the crosslinked polyethylene fiber is obtained by melt-spinning of a polyethylene polymer having a MFI of above 120 g/10 min to about 400 g/10 min, wherein subsequent to the melt-spinning step the fiber is treated with ionizing radiation to obtain a crosslinked polyethylene polymer fiber, wherein the polyethylene polymer is a polyethylene homopolymer, a polyethylene copolymer, polymer blend comprising polyethylene as one polymer, or a mixture thereof, wherein the crosslinked polyethylene polymer fiber has a MFI of about 1 to about 80 g/10 min.

7. The heat-sealable filter paper of claim 6, wherein the polyethylene polymer has an MFI of about 120 g/10 min to about 250 g/10 min.

8. The heat-sealable filter paper of claim 6, wherein the polyethylene polymer has an MFI of about 150 g/10 min to about 220 g/10 min.

9. The heat-sealable filter paper of claim 6, wherein the polyethylene polymer has an MFI of about 160 g/10 min to about 200 g/10 min.

10. The heat-sealable filter paper of claim 6, wherein the crosslinked polymer fiber has an MFI of about 40 g/10 min to 80 g/10 min.

* * * * *